2,791,520

TEXTILE ARTICLE COATED WITH TERPOLYMER OF BUTADIENE, ACRYLONITRILE, AND METHACRYLIC ACID

Roscoe H. Gerke, Nutley, and Theodore Shevzov, Garfield, N. J., assignors to United States Rubber Company, New York, N. Y., a corporation of New Jersey No Drawing. Application May 18, 1955,
Serial No. 509,402

2 Claims. (Cl. 117—161)

This invention relates to a new coated article comprising a textile product lacquered with a coating of a terpolymer of butadiene, acrylonitrile and methacrylic acid.

It is often desirable to coat a textile material with a flexible lacquer in order to improve the abrasion resistance and appearance of the material; to increase the resistance of the material against various forms of deterioration; to make the material more nearly waterproof; to increase the "slip," i. e., the ease of sliding another object over the material; etc. Preferably the lacquer also should be easy to apply without the use of complicated machinery or high temperatures, and the dried lacquer film should be substantially transparent so that at will one either can retain the unchanged color of the base material by use of the clear lacquer or can give it any desired color by the addition of suitable pigment or dye. The coating also should adhere well to the textile material, should not be tacky or easily married by, for example, the finger nails, should be scuff-resistant and ozone-resistant, and should be as flexible as the base material.

Previously used lacquer materials are deficient in one or more of these properties. For instance, it has been suggested that copolymers of butadiene and methacrylic acid be used in such lacquer coatings. However, such coatings do not adhere as well as might be desired and do not protect the textile to the extent desired.

We have now found that certain terpolymers of butadiene, acrylonitrile and methacrylic acid have all of the desirable properties mentioned above. This is most surprising because Semon—U. S. Patent 2,395,017—says that such terpolymers are plastic and tacky materials unless they are cured conventionally with sulfur. Plastic, tacky materials would be expected to be easily marred by the finger nails, and, of course, would seem totally unsuitable for applications where high slip is desired, e. g., for lacquers on textile upholstery, automobile seat covers, etc. Obviously a lacquer used on such a product not only should not stick to a person's clothing, but also, preferably, it should let a person slide across the lacquered material more easily than across the corresponding unlacquered material. Thus, is it apparent that our lacquers have valuable and entirely unexpected advantages over those of the prior art.

It is a decided and unexpected advantage of the invention that no cure of the coating is necessary, since the lacquer dries to a firm, non-tacky state without cure.

The terpolymers which are used in our invention are made conventionally, e. g., as shown by Semon, loc. cit., from the said monomers. The suitable range of amount of each monomer, in percentage by weight, contained in the terpolymer is from about 40% to 80% of butadiene, from about 10% to about 50% of acrylonitrile and from about 2% to about 25% of methacrylic acid.

The terpolymer is dissolved in any desired volatile organic solvent, suitably a polar organic liquid such as butanone (also called methyl ethyl ketone or MEK), or a solvent, or mixture of solvents, which has similar solvent power. This can be determined as described by Hildebrand and Scott, Solubility of Nonelectrolytes, 3d ed. (Reinhold), N. Y. (1950), pp. 424–439. A mixture of xylene and ethyl alcohol (80:20 by weight) is particularly suitable in making the lacquers used in this invention.

The total solid content of the lacquer, including any optional ingredients which are dissolved or suspended in the solution, ranges typically between about 1% and about 40% by weight. In general, concentrated solutions are used when the lacquer is to be applied to the base material by dipping or painting, and more dilute solutions are used when the lacquer is to be sprayed. When the lacquer contains an insoluble material, it is advisable to use a mixture whose solid content is high so that the insoluble material does not settle rapidly. Such variations in the concentration are, of course, conventional practice in the paint industry, and form no critical part of this invention.

Finely divided silica preferably is incorporated into the lacquer in order to improve the toughness of the dried coating. The silica suitably is mixed with the terpolymer on a rubber mill. Subsequently, the mixture is dispersed in the solvent. Any amount of silica up to about 100 parts per 100 parts of terpolymer can be used and we usually use at least 10 parts. Best results are obtained when about 40 to 60 parts of silica are used.

Other materials which can be present optionally in the lacquer are other fillers, pigments, dyes and plasticizers. Preferably, such materials should not react chemically with the terpolymer. Fillers and pigments which react chemically with the carboxylic acid groups of the terpolymer are less suitable if by such reaction the terpolymer in the solution becomes cross-linked, or "vulcanized." For example, it is well known that zinc oxide, as well as other metallic oxides, hydroxides or carbonates, vulcanizes carboxylic rubbers in the solid state. Such vulcanization often occurs within a few hours even at room temperature. Therefore if such vulcanizing agents are present in the lacquer, it may gel and become worthless within a few hours' or days' storage. Other optionally used materials are carbon black, zinc sulfide and lead chromate.

The coating of the invention is applied to any textile material, usually in the form of a fabric, such as, for example, cotton, viscose rayon, and nylon.

Typical lacquered articles embodying our invention are fabric covered windlace, seat covers for furniture and auto seats. The lacquers are particularly valuable for coating white products because they produce very little yellowing, even upon application of heat.

The lacquer improves the appearance and wear resistance of textile materials.

The following examples illustrate but do not limit the invention. All parts and percentages are by weight.

*Example 1*

A low-gel terpolymer of butadiene:arcrylonitrile:methacrylic acid (50:35:15), made as described by Semon, loc. cit., was masticated on a cooled rubber mill until a smooth sheet was formed. The freshly milled polymer (5 parts) was then dissolved in 95 parts of MEK to form a clear solution.

The clear lacquer was applied to cotton duck, viscose rayon fabric, and nylon fabric in order to improve their wear resistance. The air-dried films were non-tacky, flexible, mar-resistant and adhered well to the fabrics. The abrasion resistance of each coated fabric was much better than that of the respective untreated fabric.

*Example 2*

The terpolymer of Example 1 was mixed on a rubber mill with compounding ingredients to form stocks of various colors until each stock was smooth and was homogeneous in appearance. The composition of the stocks follows:

| Stocks | Light Green | Yellow | Dark Blue | White |
|---|---|---|---|---|
| Terpolymer | 100 | 100 | 100 | 100 |
| Hi-Sil a | 50 | 40 | 50 | 50 |
| Dioctyl phthalate | 3 | 5 | 5 | 4 |
| White pigment (finely divided titanium dioxide) | | | | 70 |
| Green rubber dye | 13 | | | |
| Chrome yellow pigment (lead chromate) | 1.5 | | | |
| Blue rubber dye | | 60 | | |
| | | | 6 | | a A very finely divided, slightly hydrated silica.

Each stock was made into a lacquer by stirring 10 parts of the stock with 90 parts of MEK until the mixture appeared to be homogeneous. The dispersed silica and pigments settled out only slightly during storage of the lacquers for a month in closed containers. They could be dispersed again quickly by brief shaking or stirring.

Fabrics were coated with these lacquers as in Example 1, with good results.

The dried lacquer is a soluble, uncured material, and remains so even after exposure to heat, and it can be dissolved or removed with a solvent.

This example shows typical lacquer formulations which are operable in this invention. The particular colors, fillers and plasticizer to be used shown are a matter of choice.

*Example 3*

In the same manner as in the previous examples, lacquers for coating textiles are prepared from the following stocks:

| | A | B | C |
|---|---|---|---|
| Butadiene/acrylonitrile/methacrylic acid copolymer (50/35/15) | 100 | 100 | 100 |
| Hi-Sil | 25 | 25 | |
| Zinc oxide | 0.6 | | 0.6 |

The lacquers made from stocks A and B are superior to that made from C. Resinous materials such as polyvinyl chloride, or phenolic resin (e. g. Durez resin) may be added to the lacquer stock in minor amount, e. g., 5 or 10 parts.

*Example 4*

A terpolymer of butadiene:acrylonitrile:methacrylic acid (50:30:20) was made into a lacquer which was like the green lacquer of Example 2 except for the difference in the terpolymer. This lacquer was applied to the fabric surface of cured sponge rubber fabric-covered windlace. The lacquer coat was non-tacky, flexible, tough, highly resistant to abrasion, had good slip, and was glossy and pleasing in appearance.

*Example 5*

A terpolymer of butadiene:acrylonitrile:methacrylic acid (65:31:4) was made into a lacquer which was like the green lacquer of Example 2 except for the difference in the terpolymer. The coating had the same properties as that of Example 4.

Examples 4 and 5 show that the proportions of the monomers in the terpolymer used in the lacquers of this invention can be varied widely.

Having thus described our invention, what we claim and desire to protect by Letters Patent is:

1. A composite article comprising a textile material and a non-tacky, scratch-resistant exterior surface coating film thereon comprising as the sole essential ingredient a terpolymer containing combined from about 40% to 80% of butadiene, from about 10% to 50% of acrylonitrile, and from about 2% to 25% of methacrylic acid, said film being flexible and firmly adherent to said textile material and serving as a slip finish therefor.

2. An article as in claim 1, in which the said surface coating film contains from 10 to 100 parts of finely divided silica per 100 parts of the said terpolymer.

References Cited in the file of this patent

UNITED STATES PATENTS

| | | |
|---|---|---|
| 1,973,000 | Konrad et al. | Sept. 11, 1934 |
| 2,395,017 | Semon | Feb. 19, 1946 |
| 2,470,599 | Billmeyer | May 17, 1949 |
| 2,494,848 | Whitelegg | Jan. 17, 1950 |
| 2,681,292 | Ewing et al. | June 15, 1954 |
| 2,681,327 | Brown | June 15, 1954 |